United States Patent
Oura et al.

(10) Patent No.: US 11,264,635 B2
(45) Date of Patent: Mar. 1, 2022

(54) SECONDARY BATTERY

(71) Applicant: PANASONIC INTELLECTUAL PROPERTY MANAGEMENT CO., LTD., Osaka (JP)

(72) Inventors: Yuji Oura, Osaka (JP); Tomoki Shiozaki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 105 days.

(21) Appl. No.: 15/861,922

(22) Filed: Jan. 4, 2018

(65) Prior Publication Data

US 2018/0131034 A1  May 10, 2018

Related U.S. Application Data

(63) Continuation of application No. PCT/JP2016/003140, filed on Jun. 30, 2016.

(30) Foreign Application Priority Data

Aug. 31, 2015 (JP) .............................. JP2015-170346

(51) Int. Cl.
*H01M 50/595* (2021.01)
*H01M 50/59* (2021.01)
(Continued)

(52) U.S. Cl.
CPC ........... *H01M 10/052* (2013.01); *H01M 4/13* (2013.01); *H01M 4/366* (2013.01); *H01M 4/386* (2013.01);
(Continued)

(58) Field of Classification Search
None
See application file for complete search history.

(56) References Cited

U.S. PATENT DOCUMENTS

2003/0232243 A1* 12/2003 Hong ............... H01M 50/411
429/161
2007/0172736 A1 7/2007 Fujikawa et al.
(Continued)

FOREIGN PATENT DOCUMENTS

CN 102110845 A 6/2011
CN 103013366 A 4/2013
(Continued)

OTHER PUBLICATIONS

Caplinq PIT0.5S (website: https://www.caplinq.com/blog/pit0-5s-0-5mil-polyimide-film-with-silicone-adhesive_277/) (Year: 2010).*
(Continued)

*Primary Examiner* — Yoshitoshi Takeuchi
(74) *Attorney, Agent, or Firm* — Westerman, Hattori, Daniels & Adrian, LLP

(57) ABSTRACT

A secondary battery includes a positive electrode having a positive electrode current collector and a positive electrode active material layer; a negative electrode having a negative electrode current collector and a negative electrode active material layer; a separator interposed between the electrodes; a electrolyte; a positive electrode lead; and an insulating tape that covers part of the positive electrode. The positive electrode current collector has an exposed portion connected to the positive electrode lead. The positive electrode lead has an extending portion that projects from the exposed portion and an overlapping portion that overlaps the exposed portion. At least part of the exposed portion and at least part of the overlapping portion are covered with the insulating tape. The insulating tape has a substrate layer and an adhesive layer. The substrate layer contains a polyimide. The adhesive layer has an electrical resistance of 1 k$\Omega$/mm$^2$ or more at 500° C.

12 Claims, 3 Drawing Sheets

(51) Int. Cl.
*H01M 10/052* (2010.01)
*H01M 10/0587* (2010.01)
*H01M 50/538* (2021.01)
*H01M 4/13* (2010.01)
*H01M 4/36* (2006.01)
*H01M 4/38* (2006.01)
*H01M 10/0562* (2010.01)
*H01M 10/058* (2010.01)
*H01M 50/572* (2021.01)

(52) U.S. Cl.
CPC ..... *H01M 10/058* (2013.01); *H01M 10/0562* (2013.01); *H01M 10/0587* (2013.01); *H01M 50/538* (2021.01); *H01M 50/572* (2021.01); *Y02T 10/70* (2013.01)

(56) References Cited

U.S. PATENT DOCUMENTS

| | | | |
|---|---|---|---|
| 2011/0159344 A1 | 6/2011 | Kobayashi et al. | |
| 2012/0052295 A1* | 3/2012 | Iwata | C09J 7/38 |
| | | | 428/343 |
| 2012/0328863 A1* | 12/2012 | Kuo | C09J 183/04 |
| | | | 428/220 |
| 2013/0071740 A1 | 3/2013 | Takamura et al. | |
| 2014/0037924 A1* | 2/2014 | Furuta | C09J 7/38 |
| | | | 428/214 |
| 2014/0120417 A1 | 5/2014 | Matsushita et al. | |

FOREIGN PATENT DOCUMENTS

| | | |
|---|---|---|
| JP | H09-134729 A | 5/1997 |
| JP | 9-190820 A | 7/1997 |
| JP | 2009-013361 A | 1/2009 |
| JP | 2009-245650 A | 10/2009 |
| JP | 2009-260332 A | 11/2009 |
| JP | 2010-076261 A | 4/2010 |
| JP | 2010-184979 A | 8/2010 |
| JP | 2011-138632 A | 7/2011 |
| JP | 2014-89856 A | 5/2014 |
| WO | 2013/133167 A1 | 9/2013 |
| WO | 2014/050369 A1 | 4/2014 |

OTHER PUBLICATIONS

International Search Report dated Aug. 9, 2016, issued in Counterpart of International Application No. PCT/JP2016/003140 (1 page).
English Translation of Chinese Search Report dated Dec. 4, 2019, issued in counterpart CN application No. 201680035141.4. (3 pages).

* cited by examiner

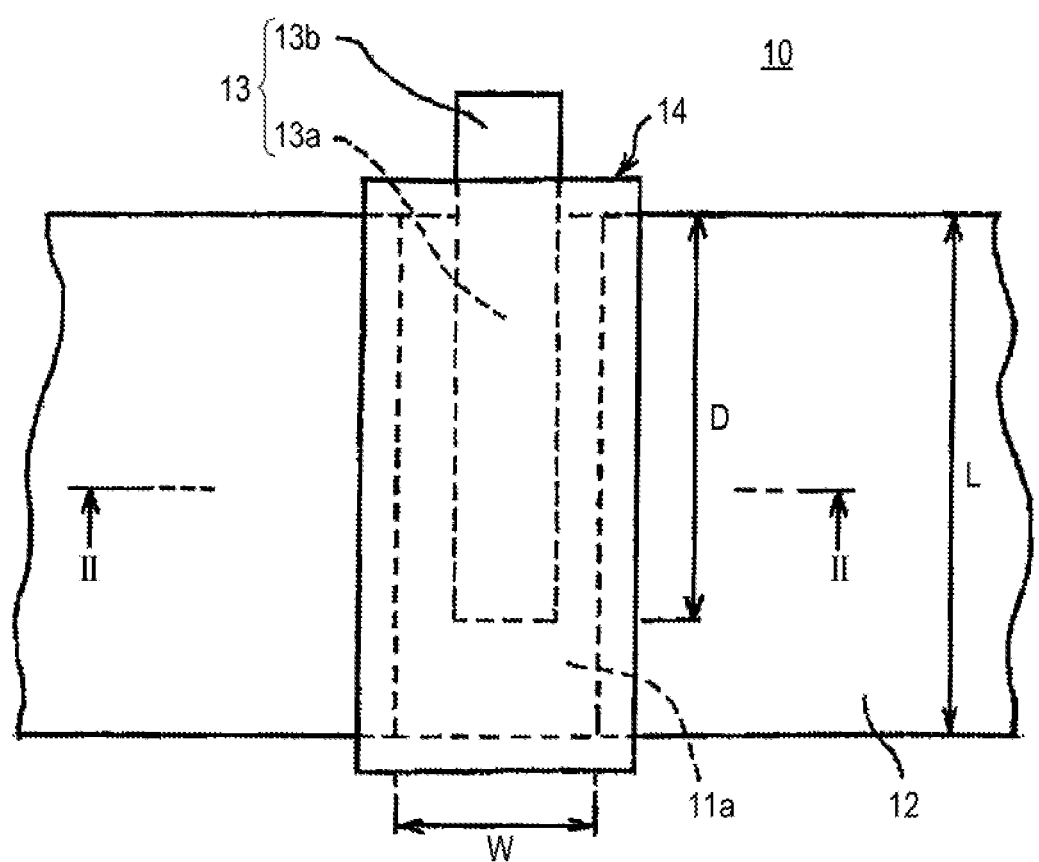
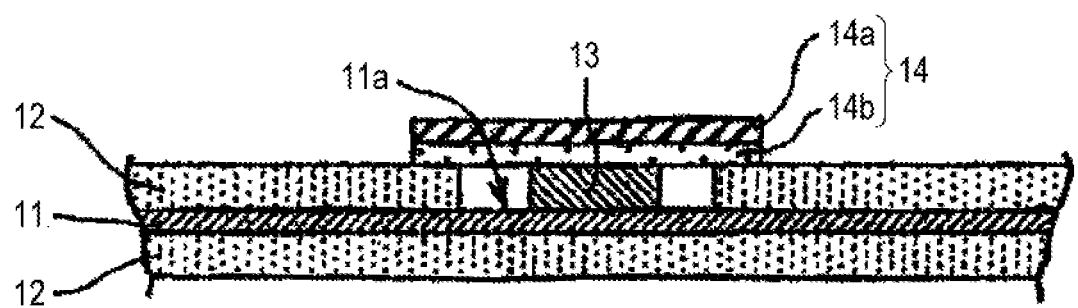

SECONDARY BATTERY

TECHNICAL FIELD

The present invention relates to secondary batteries and, more particularly, to a secondary battery having a high energy density.

BACKGROUND ART

As recent non-aqueous electrolyte secondary batteries have a higher energy density, the mass of power generating elements in battery cases having limited capacities tends to be larger. In this respect, there are more restricted demands for batteries to sufficiently ensure safety. For example, it is important to suppress heat generation in case of a short circuit by designing batteries such that a short-circuited part is unlikely to expand.

A short-circuit current is often generated from an exposed portion of a current collector. In particular, a short-circuit current tends to flow upon contact between an exposed portion of a positive electrode current collector and a negative electrode active material layer having high conductivity. Since a short-circuit current is associated with heat generation, the positive electrode active material may be damaged at this time.

In light of the forgoing circumstance, for example, Patent Literature 1 discloses that an exposed portion of a positive electrode current collector is covered with an insulating protective tape.

CITATION LIST

Patent Literature

PTL 1: Japanese Published Unexamined Patent Application No. 2014-89856

SUMMARY OF INVENTION

An insulating tape for covering an exposed portion of a positive electrode current collector is normally a tape having resistance to a non-aqueous electrolyte and having an inexpensive substrate layer made of polypropylene and an adhesive layer containing an acrylic resin or a butyl rubber.

However, in consideration of a recent rapid improvement in battery energy density, it is desired to sufficiently suppress heat generation even if batteries are contaminated with unexpectedly large foreign substances. To suppress heat generation, it is important to inhibit the increase in short-circuit current. However, if a short circuit occurs between the positive electrode current collector and the negative electrode active material layer in the latest high energy density batteries, the temperature of a short-circuited part may instantly reach 500° C. or higher. In this case, it is difficult to inhibit the increase in short-circuit current with an insulating tape known in the art.

To ensure sufficient safety in light of the forgoing circumstance, an exposed portion of the positive electrode current collector is desirably coated with an insulating tape having sufficient insulation at least at 500° C. To inhibit expansion of a short-circuited part, the insulating tape desirably retains its shape at least at 500° C.

In an aspect of the present disclosure, a secondary battery includes a positive electrode having a positive electrode current collector and a positive electrode active material layer on the positive electrode current collector; a negative electrode having a negative electrode current collector and a negative electrode active material layer on the negative electrode current collector; a separator interposed between the positive electrode and the negative electrode; a electrolyte; a positive electrode lead electrically connected to the positive electrode; and an insulating tape that covers part of the positive electrode. The positive electrode current collector has an exposed portion without the positive electrode active material layer. The positive electrode lead is connected to the exposed portion. The positive electrode lead has an extending portion that projects from the exposed portion and an overlapping portion that overlaps the exposed portion. At least part of the exposed portion and at least part of the overlapping portion are covered with the insulating tape. The insulating tape has a substrate layer and an adhesive layer. The substrate layer contains a polyimide. The adhesive layer has an electrical resistance of 1 k$\Omega$/mm$^2$ or more at 500° C.

According to the present disclosure, heat generation can be suppressed even if an internal short circuit occurs due to contamination of a secondary battery having high energy density with unexpectedly large foreign substances and penetration of these substances through an insulating tape.

BRIEF DESCRIPTION OF DRAWINGS

FIG. 1 is a plan view of the main part of a positive electrode according to an embodiment of the present invention.

FIG. 2 is a sectional view of the main part of the positive electrode illustrated in FIG. 1 taken along line II-II.

DESCRIPTION OF EMBODIMENTS

Figure 3:
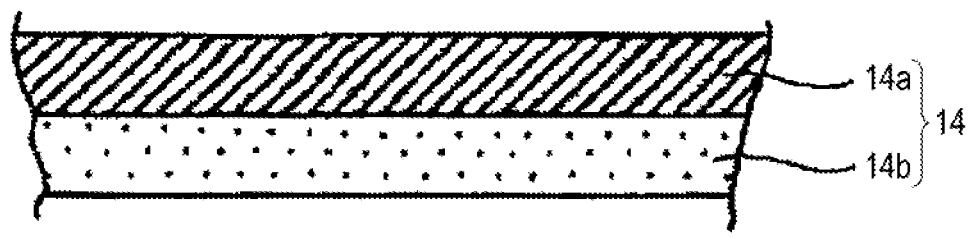
FIG. 3 is a sectional view of an insulating tape according to an embodiment of the present invention.

A secondary battery according to an embodiment of the present invention includes a positive electrode having a positive electrode current collector and a positive electrode active material layer on the positive electrode current collector; a negative electrode having a negative electrode current collector and a negative electrode active material layer on the negative electrode current collector; a separator interposed between the positive electrode and the negative electrode; a electrolyte; a positive electrode lead electrically connected to the positive electrode; and an insulating tape that covers part of the positive electrode. The positive electrode and the negative electrode may be band-shaped electrodes or may be plate electrodes. The battery may be a wound-type battery or may be a laminate-type battery.

The positive electrode current collector has an exposed portion without the positive electrode active material layer. A positive electrode lead is connected to the exposed portion. The exposed portion may be formed in any part of the positive electrode current collector. For example, in the case of a band-shaped electrode for wound-type batteries, the exposed portion is provided in, for example, an end portion of the band-shaped electrode on the winding start side, an end portion on the winding end side, or a portion sufficiently distant from both ends (a portion near the longitudinal center).

The positive electrode lead has an extending portion that projects from the exposed portion and an overlapping portion that overlaps the exposed portion. The extending portion is connected to the positive electrode terminal or a component in the battery, the component being in electrical communication with the positive electrode terminal. At least part of the overlapping portion is welded to the exposed portion or bonded to the exposed portion through a conductive bonding material.

The insulating tape covers at least part of the exposed portion of the positive electrode current collector and at least part of the overlapping portion of the positive electrode lead. The insulating tape has a substrate layer and an adhesive layer. This configuration can suppress a short circuit between the exposed portion of the positive electrode current collector and the negative electrode active material layer. To sufficiently ensure battery safety, however, there is a need to assume that the battery may be contaminated with unexpectedly large foreign substances and these foreign substances may penetrate the insulating tape.

When the substrate layer of the insulating tape contains a polyimide, and the adhesive layer has an electrical resistance of 1 kΩ/mm² or more, preferably 8 kΩ/mm² or more at 500° C., a short-circuited part is unlikely to expand even if large foreign substances penetrate the insulating tape. Thus, the short-circuit current is less likely to increase, and heat generation can be suppressed accordingly. To obtain a great effect of inhibiting expansion of a short-circuited part and the increase in short-circuit current, the adhesive layer preferably retains an electrical resistance of 1 kΩ/mm² or more at 600° C. or even at 700° C.

Assuming an acrylic resin or a butyl rubber is used for the adhesive layer, the adhesive layer melts or undergoes thermal decomposition if large foreign substances penetrate the insulating tape and the temperature of a short-circuited part instantly increases. Such melting or thermal decomposition makes it difficult for the adhesive layer to retain an electrical resistance of 1 kΩ/mm² or more. Because of this difficulty, the short-circuit current may increase to accelerate heat generation. When the adhesive layer can retain an electrical resistance of 1 kΩ/mm² or more even at 500° C., expansion of a short-circuited part and the increase in short-circuit current are suppressed even if the temperature of a short-circuited part temporarily increases to 500° C. or higher. Heat generation is suppressed accordingly, and a short-circuit current can be reduced before abnormal heat generation occurs.

When polypropylene is used for the substrate layer, it is difficult to maintain the shape of the insulating tape if the temperature of a short-circuited part exceeds the melting point of polypropylene. When a polyimide is used for the substrate layer, the shape of the insulating tape can be maintained even if the temperature of a short-circuited part temporarily increases to 500° C. or higher.

When a polyimide is used for the substrate layer and the thickness of the substrate layer is as large as, for example, 50 μm or more, an electrical resistance of 1 kΩ/mm² or more may be maintained at least for a certain period of time even at a temperature of 500° C. or higher. However, the substrate layer having a large thickness hinders the design of a high energy density battery. With the substrate layer alone, it is thus difficult to handle an internal short circuit caused by contamination with large foreign substances.

The components of the adhesive layer are not limited as long as the adhesive layer has an electrical resistance of 1 kΩ/mm² or more at 500° C. In the case of a high energy density battery, the battery case having a limited capacity contains as many power generating elements as possible. Therefore, the thickness of the insulating tape is preferably as small as possible. In light of the foregoing circumstance, the adhesive layer preferably contains a silicone. The silicone can maintain a large electrical resistance at high temperatures even if the thickness is small.

To increase the energy density of the battery, the thickness of the insulating tape is preferably 45 μm or less and more preferably 35 μm or less. However, if the insulating tape is too thin, the insulating tape may have low strength and low insulation. To ensure that the insulating tape has sufficient strength and sufficient insulation, the thickness of the insulating tape is preferably 15 μm or more and more preferably 25 μm or more.

The thickness $T_{ad}$ of the adhesive layer is preferably, for example, 5 μm to 25 μm to obtain both adhesion properties and sufficient electrical resistance. When the thickness $T_{ad}$ of the adhesive layer is 5 μm or more, the adhesive layer easily retains an electrical resistance of 1 kΩ/mm² or more even at a high temperature of 500° C. or higher. When the thickness $T_{ad}$ of the adhesive layer is 25 μm or less, the total thickness of the insulating tape is small, which is advantageous in increasing the energy density of the battery.

The adhesive layer can be used as long as the adhesive layer retains an electrical resistance of 1 kΩ/mm² or more at 500° C. for 1 minute or longer. The electrical resistance of the adhesive layer at 500° C. can be determined by the following method. First, an adhesive layer that has been cut out in a size of 1 cm² is sandwiched between two platinum plate electrodes, and the adhesive layer is maintained at 500° C. In this state, the electrical resistance is measured. When an electrical resistance of 1 kΩ/mm² or more can be maintained for 1 minute after a sample of the adhesive layer reaches 500° C., the adhesive layer is supposed to have an electrical resistance of 1 kΩ/mm² or more at 500° C.

The thickness $T_{sb}$ of the substrate layer is preferably, for example, 10 μm to 30 μm. When the thickness $T_{sb}$ of the substrate layer is 10 μm or more, it is easy to maintain the electrical resistance of the insulating tape even at a temperature as high as 500° C. or higher, the strength of the insulating tape is ensured, and the insulating tape is rarely damaged even if the battery is contaminated with large foreign substances. When the thickness $T_{sb}$ of the substrate layer is 30 μm or less, it is easy to design a thin insulating tape having high strength.

The ratio $T_{ad}/T_{sb}$ of the thickness $T_{ad}$ of the adhesive layer to the thickness $T_{sb}$ of the substrate layer is preferably, for example, 0.2 to 1. With such a ratio, it is easy to prevent the insulating tape from having a large thickness and obtain both high strength and large electrical resistance at high temperatures.

As used herein, the term "secondary battery having high energy density" refers to a battery having a volume energy density of, for example, 400 Wh/L or more, particularly 600 Wh/L or more. The volume energy density is a characteristic value obtained by dividing the product of the nominal voltage and the nominal capacity of the battery by the volume of the battery.

A lithium-ion secondary battery according to an embodiment of the present invention will be described below in more detail with reference to the drawings.

(Positive Electrode)

The positive electrode has a positive electrode current collector and a positive electrode active material layer on the positive electrode current collector. The positive electrode current collector has an exposed portion without the positive electrode active material layer. The exposed portion may be a double-sided exposed portion where no positive electrode active material layer is formed on either surface of the positive electrode current collector, or may be a single-sided exposed portion where no positive electrode active material layer is formed on one surface of the positive electrode current collector (that is, the positive electrode active material layer is formed on the other surface). The exposed portion may have any shape. For a band-shaped electrode, the exposed portion preferably has a narrow slit shape and forms an angle of 80 to 100 degrees with respect to the longitudinal direction of the positive electrode current collector. The width of the exposed portion having a slit shape is preferably 3 mm to 20 mm to suppress the reduction in energy density.

The positive electrode current collector is formed of a sheet-shaped conductive material, preferably a metal foil. Examples of suitable metals for forming the metal foil include aluminum, aluminum alloys, stainless steel, titanium, and titanium alloys. The thickness of the positive electrode current collector is, for example, 1 to 100 μm and preferably 10 to 50 μm.

The positive electrode active material layer of the lithium-ion secondary battery contains a positive electrode active material, a conductive agent, a binding agent, and the like. The positive electrode active material is a material that can be doped and de-doped with lithium ions and is preferably, for example, a lithium-containing composite oxide. The lithium-containing composite oxide contains a transition metal whose valence is changed by oxidation-reduction. Examples of the transition metal include vanadium, manganese, iron, cobalt, nickel, and titanium. Specific examples include $LiCoO_2$, $LiMn_2O_4$, $LiNiO_2$, $LiNi_{x1}Mn_{y1}Co_{1-(x1+y1)}O_2$, $LiNi_{x2}Co_{y2}M_{1-(x2+y2)}O_2$, $\alpha LiFeO_2$, and $LiVO_2$. Here, x1 and y1 respectively satisfy $0.25 \leq x1 \leq 0.5$ and $0.25 \leq y1 \leq 0.5$, x2 and y2 respectively satisfy $0.75 \leq x2 \leq 0.99$ and $0.01 \leq y2 \leq 0.25$, and M is at least one element selected from the group consisting of Na, Mg, Sc, Y, Ti, V, Cr, Fe, Cu, Ag, Zn, Al, Ga, In, Sn, Pb, and Sb.

Examples of the conductive agent contained in the positive electrode active material layer include carbon black, graphite, and carbon fiber. The amount of the conductive agent is, for example, 0 to 20 parts by mass per 100 parts by mass of the positive electrode active material. Examples of the binding agent contained in the positive electrode active material layer include fluororesins, acrylic resins, and rubber particles. The amount of the binding agent is, for example, 0.5 to 15 parts by mass per 100 parts by mass of the active material.

The positive electrode active material layer is formed by kneading, with a dispersion medium, a positive electrode mixture containing a positive electrode active material, a binding agent, a conductive agent, and the like to prepare a positive electrode paste and applying the positive electrode paste to a predetermined region of the surface of the positive electrode current collector, followed by drying and rolling. Examples of the dispersion medium include organic solvents and water. Examples of suitable organic solvents include, but are not limited to, N-methyl-2-pyrrolidone (NMP). The thickness of the positive electrode active material layer is, for example, 70 μm to 250 μm and preferably 100 μm to 200 μm.

The positive electrode current collector has an exposed portion without the positive electrode active material layer. For a band-shaped positive electrode, the exposed portion can be formed in an end portion of the positive electrode in the longitudinal direction or in regions other than the end portion (e.g., at positions at a distance of 20% or more of the length of the positive electrode from both end portions) by intermittently applying the positive electrode paste to the positive electrode current collector. Here, the exposed portion is preferably a slit-shaped exposed portion where a portion of a band-shaped positive electrode current collector is exposed from one end to the other end in the width direction. The exposed portion may be formed by removing part of the positive electrode active material layer from the positive electrode.

For example, a strip-shaped (slip-shaped) positive electrode lead is electrically connected to the exposed portion. At least part of a portion of the positive electrode lead (overlapping portion) that overlaps the exposed portion is bonded to the exposed portion by welding. Subsequently, at least part of the exposed portion (preferably 90% or more of the area of the exposed portion) of the positive electrode current collector and at least part of the overlapping portion (preferably 90% or more of the area of the overlapping portion) of the positive electrode lead are both covered with the insulating tape.

The positive electrode lead 13 is made of, for example, aluminum, an aluminum alloy, nickel, a nickel alloy, iron, or stainless steel. The positive electrode lead 13 has a thickness of, for example, 10 μm to 120 μm and preferably 20 μm to 80 μm. The positive electrode lead 13 may have any size but may have, for example, a strip shape 2 mm to 8 mm wide and 20 mm to 80 mm long.

FIG. 1 is a plan view of the main part of a band-shaped positive electrode according to an embodiment of the present invention. FIG. 2 is a sectional view of the positive electrode illustrated in FIG. 1 taken along line II-II. A band-shaped positive electrode 10 has a positive electrode active material layer 12 on each surface of a positive electrode current collector 11 except for part of one surface. A slit-shaped exposed portion 11a where a portion of the positive electrode current collector 11 is exposed from one end to the other end in the width direction is provided on one surface of the positive electrode current collector 11. The width W of the exposed portion 11a, which depends on the size of the battery, is normally larger than the width of the positive electrode lead 13. The width W of the exposed portion 11a is, for example, 3 mm to 20 mm and preferably 5 mm to 16 mm. Part of an overlapping portion 13a of the strip-shaped positive electrode lead 13 is welded to the exposed portion 11a. The length D of the overlapping portion (the distance from the boundary between the overlapping portion 13a and an extending portion 13b to the end of the overlapping portion 13a that is most distant from the boundary) depends on the size of the battery. The length D is, for example, 10 mm to 60 mm and corresponds to 5% to 100%, preferably 20% to 95% of the width L (the length in the transverse direction) of the positive electrode current collector 11.

To maximize the effect of avoiding an internal short circuit, the insulating tape 14 covers the entire surface of the exposed portion 11a and covers the entire surface of the overlapping portion 13a of the positive electrode lead 13. The insulating tape 14 has a substrate layer 14a and an adhesive layer 14b and is pasted to the exposed portion 11a through the adhesive layer 14b.

To ensure that the exposed portion 11a is covered with the insulating tape 14, the insulating tape 14 preferably extends from both ends of the positive electrode 10 in the width direction. The length of the insulating tape 14 extending from the positive electrode 10 is preferably 0.5 mm or more at each end. The length of the insulating tape 14 extending from the positive electrode 10 is preferably 20 mm or less not to inhibit achievement of high battery energy density. Similarly, the insulating tape 14 extends from both ends of the exposed portion 11a in the width direction onto the positive electrode active material layer 12. The length of the insulating tape 14 extending onto the positive electrode active material layer 12 is preferably 0.5 mm or more and preferably 5 mm or less at each end.

Next, the insulating tape will be described in more detail.

As illustrated in FIG. 3, the insulating tape 14 has the substrate layer 14a and the adhesive layer 14b. The substrate layer 14a is formed of, for example, a resin film and has the function of maintaining the shape of the insulating tape 14. The substrate layer 14a contains a polyimide. The adhesive layer 14b has the function of attaching the insulating tape 14 to an exposed portion of the current collector. The adhesive layer 14b has an electrical resistance of 1 kΩ/mm² or more at a temperature of 500° C. or higher. The insulating tape 14 may further include another layer for increasing insulation and/or thermal resistance. For example, the insulating tape 14 may have an insulating filler-containing layer between the substrate layer and the adhesive layer.

The substrate layer contains at least a polyimide and may also contain a material other than the polyimide. For example, the substrate layer may be made of a polymer alloy of a polyimide and a resin (second resin) other than the polyimide. The substrate layer may have a multilayer structure containing a polyimide layer and a second resin layer. The amount of the polyimide in the substrate layer is preferably 80% by mass or more and more preferably 90% by mass or more.

Polyimide is a general term for polymers containing an imide bond in the repeat unit and usually refers to aromatic polyimide in which aromatic compounds are linked to each other directly through an imide bond. An aromatic polyimide has a conjugate structure where an imide bond is interposed between aromatic rings and has a rigid and strong molecular structure. Examples of polyimides include, but are not limited to, wholly aromatic polyimides, such as polypyromellitimide; semi-aromatic polyimides, such as polyetherimide; and thermosetting polyimides formed by the reaction between bismaleimide and aromatic diamines. In particular, non-thermoplastic polyimides, which are unlikely to deform even at a temperature of 500° C. or higher, are preferred. When the substrate layer contains a polyimide, the shape of the insulating tape is maintained even at a temperature of 500° C. or higher. However, polyimides tend to degrade when exposed to high temperatures for a long time. It may thus be difficult to maintain electrical resistance high only by using a polyimide.

In this respect, it is important to use an adhesive layer having an electrical resistance of 1 kΩ/mm² or more even at a temperature of 500° C. or higher. Examples of materials having an electrical resistance of 1 kΩ/mm² or more at a temperature of 500° C. or higher include, but are not limited to, silicones, melamine resins, and phenolic resins. Among these, silicones are preferred because of high stability and ease of handling.

The adhesive layer may also contain a material other than the above-mentioned materials. For example, the adhesive layer may be made of a polymer alloy of a silicone and a resin (third resin) other than the silicone. The adhesive layer may have a multilayer structure containing a silicone layer and a third resin layer. The adhesive layer may also contain an insulating filler. When a silicone is used, the amount of the silicone in the adhesive layer is preferably 80% by mass or more and more preferably 90% by mass or more.

Silicone is a synthetic polymer (polysiloxane) containing a siloxane bond (—Si—O—Si—) in the main chain backbone and is a general term for silicone oil, silicone rubber, and silicone resin. Since silicones have both the inorganic nature originated from siloxane bonding and the organic nature originated from the organic side chain, silicones exert adhesion properties and have good thermal resistance and good insulation. Silicones are gradually denatured or decomposed at a very high temperature but the rate of denaturation or decomposition is low. Therefore, silicones do not seem to degrade rapidly even if an internal short circuit occurs and the temperature of a short-circuited part increases drastically. Examples of silicones include, but are not limited to, dimethylpolysiloxane and diphenylpolysiloxane. Examples of silicones also include modified silicones having a polyether group, an epoxy group, an amine group, a carboxyl group, an aralkyl group, or other groups in the side chain or terminal of polysiloxanes.

As described above, the substrate layer containing a polyimide and the adhesive layer containing a silicone each have advantages and disadvantages. The thickness of the insulating tape is preferably controlled to 45 μm or less so as not to inhibit achievement of high battery energy density. Therefore, the ratio between the thicknesses of these two layers is desirably controlled within the limited thickness range to maximize the advantages of the layers, and the disadvantages of one layer are desirably compensated by the other layer as much as possible. In view of this, the thickness $T_{ad}$ of the adhesive layer is preferably controlled to 5 μm to 25 μm and more preferably controlled to 5 μm to 20 μm. The thickness $T_{sb}$ of the substrate layer is preferably controlled to 10 μm to 30 μm and more preferably controlled to 15 μm to 25 μm. The ratio $T_{ad}/T_{sb}$ of the thickness $T_{ad}$ of the adhesive layer to the thickness $T_{sb}$ of the substrate layer is preferably controlled to 0.2 to 1 and more preferably controlled to 0.2 to 0.8.

(Negative Electrode)

The negative electrode has a negative electrode current collector and a negative electrode active material layer on the negative electrode current collector. The negative electrode current collector also normally has an exposed portion without the negative electrode active material layer. For example, a strip-shaped negative electrode lead may be connected to the exposed portion.

The negative electrode current collector is formed of a sheet-shaped conductive material, preferably a metal foil. Examples of suitable metals for forming the metal foil include copper, copper alloys, nickel, nickel alloys, and stainless steel. The thickness of the negative electrode current collector is, for example, 1 to 100 μm and preferably 2 to 50 μm.

The negative electrode active material layer of the lithium-ion secondary battery contains a negative electrode active material, a binding agent, and the like. The negative electrode active material is a material that can be doped and de-doped with lithium ions. Examples of the material include various graphites, such as natural graphite and synthetic graphite, carbon black, mesocarbon microbeads, hard carbon, transition metal compounds that can be doped and de-doped with lithium ions at a voltage lower than that of the positive electrode, silicon, silicon oxide, silicon alloys, tin, tin oxide, and tin alloys.

Examples of the binding agent in the negative electrode active material layer include fluororesins, acrylic resins, rubber particles, and cellulose resins (e.g., carboxymethyl cellulose). The amount of the binding agent is, for example, 0.5 to 15 parts by mass per 100 parts by mass of the active material.

The negative electrode active material layer is formed by kneading, with a dispersion medium, a negative electrode mixture containing a negative electrode active material, a binding agent, and the like to prepare a negative electrode paste and applying the negative electrode paste to a predetermined region of the surface of the negative electrode current collector, followed by drying and rolling. Examples of the dispersion medium include organic solvents and water, which are the same as those in the positive electrode paste. The negative electrode paste can be applied in the same way as that for the positive electrode. The thickness of the negative electrode active material layer is, for example, 70 μm to 250 μm and preferably 100 μm to 200 μm.
(Electrolyte)

The electrolyte is prepared by dissolving a lithium salt in a non-aqueous solvent. Examples of the non-aqueous solvent include cyclic carbonates, such as ethylene carbonate and propylene carbonate; chain carbonates, such as dimethyl carbonate, diethyl carbonate, and ethyl methyl carbonate; lactones, such as γ-butyrolactone; chain carboxylates, such as methyl formate and methyl acetate; halogenated alkanes, such as 1,2-dichloroethane; alkoxy alkanes, such as 1,2-dimethoxyethane; ketones, such as 4-methyl-2-pentanone; chain ethers, such as pentafluoropropylmethyl ether; cyclic ethers, such as 1,4-dioxane and tetrahydrofuran; nitriles, such as acetonitrile; amides, such as N,N-dimethylformamide; carbamates, such as 3-methyl-2-oxazolidone; sulphur-containing compounds, such as sulfoxides (e.g., sulfolane, dimethyl sulfoxide) and 1,3-propanesultone; and halogenated products formed by substituting hydrogen atoms of these solvents with halogen atoms such as a fluorine atom. These non-aqueous solvents may be used alone or in combination of two or more.

Examples of lithium salts include $LiPF_6$, $LiBF_4$, $LiAsF_6$, $LiSbF_6$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiClO_4$, $LiAlCl_4$, and $Li_2B_{10}Cl_{10}$. These lithium salts may be used alone or in combination of two or more. The concentration of the lithium salt in the electrolyte is, for example, 0.5 to 1.7 mol/L and preferably 0.7 to 1.5 mol/L.
(Separator)

The separator may be, for example, a fine porous film made of a resin or a non-woven fabric. Examples of the resin that constitutes the separator include polyolefins such as polyethylene and polypropylene; polyamides; polyamide-imides; and polyimides. The thickness of the separator is, for example, 5 to 50 μm.

Figure 4:
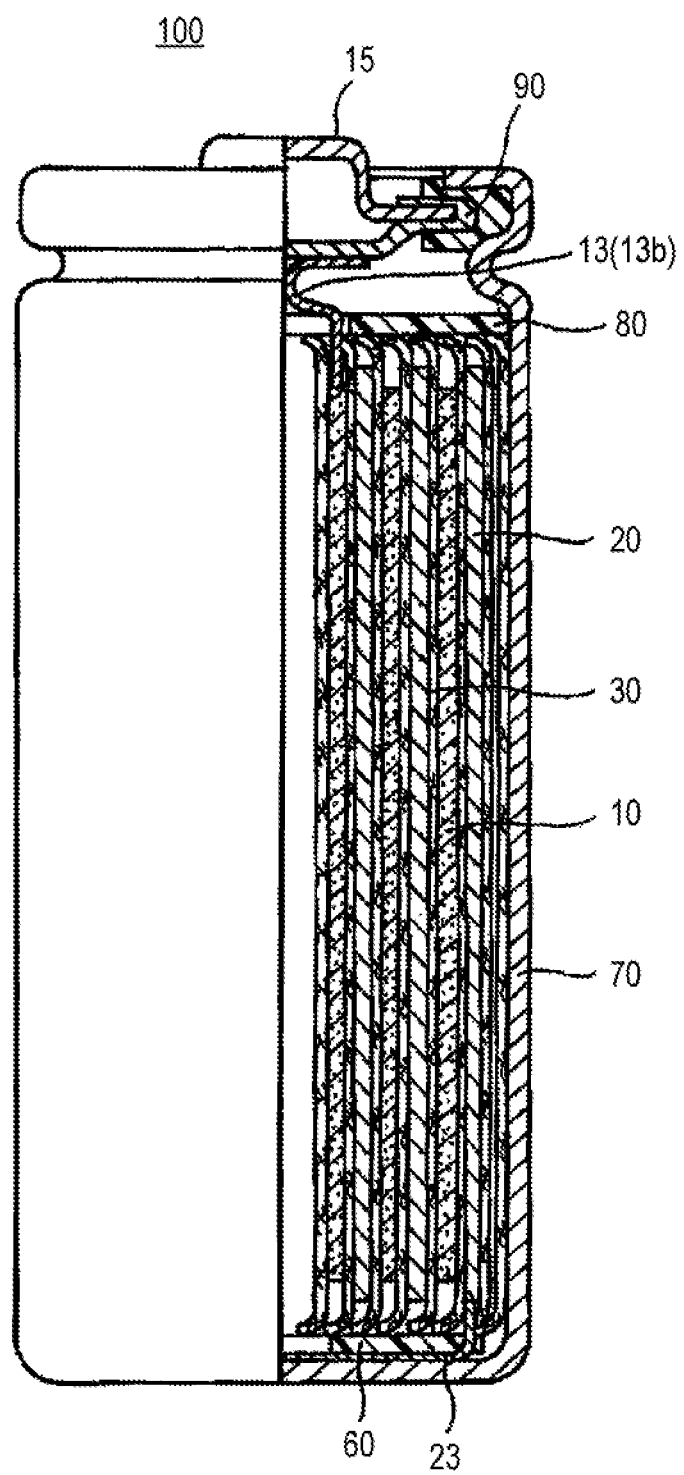
FIG. 4 is a front sectional view of part of a cylindrical secondary battery according to an embodiment of the present invention.

FIG. 4 is a longitudinal sectional view of an example cylindrical lithium-ion secondary battery according to an embodiment of the present invention.

The lithium-ion secondary battery 100 is a wound-type battery containing a wound-type electrode group and a electrolyte (not shown). The electrode group contains a band-shaped positive electrode 10, a band-shaped negative electrode 20, and a separator 30. A positive electrode lead 13 is connected to the positive electrode, and a negative electrode lead 23 is connected to the negative electrode. For the positive electrode lead 13, only the extending portion 13b is illustrated and neither the overlapping portion nor the insulating tape is illustrated.

One end of the positive electrode lead 13 is connected to an exposed portion of the positive electrode 10, and the other end is connected to the sealing plate 90. The sealing plate 90 has a positive electrode terminal 15. One end of the negative electrode lead 23 is connected to the negative electrode 20, and the other end is connected to the bottom of a battery case 70, which serves as a negative electrode terminal. The battery case 70 is a bottomed cylindrical battery can. The battery case 70 is open at one end in the longitudinal direction, and the bottom at the other end serves as a negative electrode terminal. The battery case 70 is made of metal, for example, iron. The inner surface of the battery case 70 made of iron is normally plated with nickel. The electrode group is sandwiched between an upper insulating plate 80 and a lower insulating plate 60, which are each made of a resin and respectively disposed above and below the electrode group.

The shape of the battery is not be limited to a cylindrical shape and may be, for example, a prismatic shape or a flat shape. The battery case may be formed of a laminate film.

EXAMPLES

The present invention will be described below in more detail by way of Examples. It should be understood that the present invention is not limited to Examples described below.

Example 1

(1) Production of Positive Electrode

A positive electrode paste was prepared by mixing 100 parts by mass of $LiNi_{0.82}Co_{0.15}Al_{0.03}O_2$, which was a positive electrode active material, 1.0 part by mass of acetylene black, 0.9 parts by mass of polyvinylidene fluoride (binding agent), and an appropriate amount of NMP. The prepared positive electrode paste was uniformly applied to each surface of an aluminum foil, 20 μm thick, serving as a positive electrode current collector, followed by drying and rolling. A band-shaped positive electrode 58 mm wide was produced accordingly. It is noted that a slit-shaped exposed portion where a portion of the positive electrode current collector was exposed from one end to the other end in the width direction was provided near the longitudinal center on each surface of the positive electrode. In this case, the width W of the exposed portion was 6.5 mm.

Next, a strip-shaped positive electrode lead, 3.5 mm wide and 68 mm long, made of aluminum was overlaid on one surface of the exposed portion of the positive electrode current collector and positioned such that the length of the extending portion was 15 mm and the length (length D) of the overlapping portion was 53 mm. In this state, the overlapping portion was welded to the exposed portion.

Subsequently, an insulating tape was attached to the positive electrode so as to cover the entire surface of the exposed portion and the entire surface of the overlapping portion. To ensure that the exposed portion was covered with the insulating tape, the insulating tape was positioned to extend 2 mm from both ends of the positive electrode in the width direction. The insulating tape was also positioned to extend 2 mm from both ends of the exposed portion in the width direction onto the positive electrode active material layer.

Here, an insulating tape including a 100% polyimide substrate layer 25 μm thick and a silicone adhesive layer (silicone content: 100% by mass) 7 μm thick was used. A non-thermoplastic polyimide having the backbone represented by formula (1) below was used as a polyimide. The polyimide having the following structure is synthesized by, for example, the reaction between pyromellitic anhydride and diaminodiphenyl ether.

[Chem. 1]

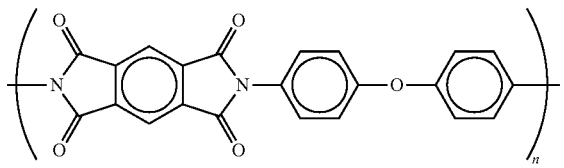

(1)

Dimethylpolysiloxane was used as a silicone. The electrical resistance of the adhesive layer at 500° C. was measured by the above-described method and found to be about 10 k$\Omega$/mm$^2$.

(2) Production of Negative Electrode

A negative electrode paste was prepared by mixing 100 parts by mass of synthetic graphite flakes having a mean particle size of about 20 μm and serving as a negative electrode active material, 1 part by mass of styrene-butadiene rubber (SBR) (binding agent), 1 part by mass of carboxymethyl cellulose (thickening agent), and water. The prepared negative electrode paste was uniformly applied to each surface of a copper foil, 8 μm thick, serving as a negative electrode current collector, followed by drying and rolling. A band-shaped negative electrode 59 mm wide was produced accordingly. It is noted that an exposed portion where a portion of the negative electrode current collector was exposed from one end to the other end in the width direction was provided on each surface in an end portion of the negative electrode on the winding end side.

Next, a strip-shaped negative electrode lead, 3 mm wide and 40 mm long, made of nickel was overlaid on the exposed portion of the negative electrode current collector and positioned. In this state, the overlapping portion was welded to the exposed portion.

(3) Production of Electrode Group

An electrode group was formed by layering the positive electrode and the negative electrode with the separator interposed therebetween, followed by winding. In this process, as illustrated in FIG. 4, the extending portion of the positive electrode lead was positioned to project from one end surface of the electrode group, and the extending portion of the negative electrode lead was positioned to project from the other end surface.

(4) Preparation of Non-Aqueous Electrolyte

A non-aqueous electrolyte was prepared by dissolving 1.4 mol/L of LiPF$_6$ in a solvent mixture of ethylene carbonate, ethyl methyl carbonate, and dimethyl carbonate (volume ratio 1:1:8).

(5) Production of Battery

The electrode group sandwiched between a lower insulating ring and an upper insulating ring was placed in a battery case (18 mm in diameter and 65 mm in height) made of iron and having the nickel-plated inner surface. In this process, the negative electrode lead was placed between the lower insulating ring and the bottom of the battery case. The positive electrode lead was passed through a through-hole at the center of the upper insulating ring. Next, an electrode bar was passed through a hollow at the center of the electrode group and a through-hole at the center of the lower insulating ring. In this state, one end portion of the negative electrode lead was welded to the inner bottom of the battery case. In addition, one end portion of the positive electrode lead extending from the through-hole of the upper insulating ring was welded to the inner surface of a sealing plate having a gasket in its peripheral portion. Subsequently, grooving was performed on an area near the opening of the battery case, and a non-aqueous electrolyte was injected into the battery case, so that the electrode group was impregnated with the non-aqueous electrolyte. Next, the opening of the battery case was closed with the sealing plate, and the opening end portion of the battery case was crimped to the peripheral portion of the sealing plate with a gasket interposed therebetween, producing a cylindrical non-aqueous electrolyte secondary battery (energy density: 700 Wh/L).

Example 2

A battery was produced in the same manner as that in Example 1 except that the thickness of the adhesive layer of the insulating tape was changed to 15 μm.

Comparative Example 1

A battery was produced in the same manner as that in Example 1 except that the adhesive layer of the insulating tape was changed to an adhesive layer, 25 μm thick, containing an acrylic resin as a main component.

Comparative Example 2

A battery was produced in the same manner as that in Example 1 except that the adhesive layer of the insulating tape was changed to an adhesive layer, 35 μm thick, containing an acrylic resin as a main component.

Comparative Example 3

A battery was produced in the same manner as that in Comparative Example 1 except that the substrate layer of the insulating tape was changed to a 100% polypropylene substrate layer 25 μm thick.

Comparative Example 4

A battery was produced in the same manner as that in Comparative Example 2 except that the substrate layer of the insulating tape was changed to a 100% polypropylene substrate layer 25 μm thick.

The components of the insulating tape are summarized in Table 1.

TABLE 1

| | Substrate Layer | | Adhesive Layer | |
|---|---|---|---|---|
| | Material | Thickness (μm) | Material | Thickness (μm) |
| Example 1 | polyimide | 25 | silicone | 7 |
| Example 2 | polyimide | 25 | silicone | 15 |
| Comparative Example 1 | polyimide | 25 | acrylic resin | 25 |
| Comparative Example 2 | polyimide | 25 | acrylic resin | 35 |
| Comparative Example 3 | polypropylene | 25 | acrylic resin | 25 |
| Comparative Example 4 | polypropylene | 25 | acrylic resin | 35 |

[Evaluation]

The battery forced internal short-circuit test was carried out in accordance with JIS C 8714. Here, two types of forced internal short-circuit tests were carried out: a standard test using nickel small pieces of standard size; and a severe test using nickel small pieces of larger size. Each nickel small piece was disposed between the insulating tape and the separator such that the small piece penetrates the insulating tape. In this process, the maximum attainable temperature of the battery side surface was measured by using a thermocouple. The results are shown in Table 2.

(Small Piece for Standard Test)

L shape 0.2 mm in height, 0.1 mm in width, and 1 mm in each side (angle 90°)

(Small Piece for Severe Test)

L shape 0.5 mm in height, 0.2 mm in width, and 3 mm in each side (angle 90°)

TABLE 2

|  | Maximum Temperature (° C.) | |
|---|---|---|
|  | Standard Test | Severe Test |
| Example 1 | 25 | 40 |
| Example 2 | 25 | 30 |
| Comparative Example 1 | 25 | >100 |
| Comparative Example 2 | 25 | >100 |
| Comparative Example 3 | 40 | >150 |
| Comparative Example 4 | 30 | >150 |

As is apparent from Tables 1 and 2, good results are obtained in the standard test even using the insulating tapes of Comparative Examples 1 to 4, which indicates that the insulating tapes of Comparative Examples 1 to 4 can ensure safety in the case where an internal short circuit occurs to a conventionally expected degree. However, the results of the severe test indicate that there are significant differences in safety depending on the type of insulating tape in the case where an unexpected internal short circuit occurs. Furthermore, sufficient safety is ensured in Examples 1 and 2 although the insulating tapes are thinner than those in Comparative Examples 1 to 4. This suggests that it is advantageous to use a substrate layer containing a polyimide and an adhesive layer having an electrical resistance of 1 kΩ/mm² or more at 500° C. in order to increase the energy density of the battery.

INDUSTRIAL APPLICABILITY

The secondary battery according to the present invention is highly safe because heat generation or thermal runaway can be suppressed effectively even if an internal short circuit occurs due to unexpectedly large foreign substances. Therefore, the secondary battery is suitably used as a driving source for electronic devices, such as laptop computers and mobile phones, a power storage device requiring high output, and a power source for electric vehicles, hybrid cars, and power tools.

REFERENCE SIGNS LIST

10 Positive Electrode
11 Positive Electrode Current Collector
11a Exposed Portion of Positive Electrode Current Collector
12 Positive Electrode Active Material Layer
13 Positive Electrode Lead
13a Overlapping Portion
13b Extending Portion
14 Insulating Tape
14a Substrate Layer
14b Adhesive Layer
15 Positive Electrode Terminal
20 Negative Electrode
23 Negative Electrode Lead
30 Separator
60 Lower Insulating Plate
70 Battery Case
80 Upper Insulating Plate
90 Sealing Plate
100 Lithium-Ion Secondary Battery

The invention claimed is:

1. A secondary battery comprising:
a positive electrode having a positive electrode current collector and a positive electrode active material layer on the positive electrode current collector;
a negative electrode having a negative electrode current collector and a negative electrode active material layer on the negative electrode current collector;
a separator interposed between the positive electrode and the negative electrode;
an electrolyte;
a positive electrode lead electrically connected to the positive electrode; and
an insulating tape that covers part of the positive electrode,
wherein
the positive electrode current collector has an exposed portion without the positive electrode active material layer,
and at least part of the exposed portion is covered with the insulating tape,
the insulating tape has a substrate layer and an adhesive layer,
the substrate layer contains a polyimide, and
the adhesive layer has an electrical resistance of 1 kΩ/mm² or more at 500° C. and contains at least one of the group consisting of a melamine resin and a phenolic resin;
wherein the adhesive layer has a thickness $T_{ad}$ of 5 μm to 25 μm, the substrate layer has a thickness $T_{sb}$ of 10 μm to 30 μm and a ratio $T_{ad}/T_{sb}$ of the thickness $T_{ad}$ of the adhesive layer to the thickness $T_{sb}$ of the substrate layer is 0.2 to 1; and
wherein the adhesive layer further contains a silicone, and an amount of the silicone in the adhesive layer is 80% by mass or more.

2. The secondary battery according to claim 1, wherein the insulating tape has a thickness of 45 μm or less.

3. The secondary battery according to claim 1,
wherein
the positive electrode lead is connected to the exposed portion,
the positive electrode lead has an extending portion that projects from the exposed portion and an overlapping portion that overlaps the exposed portion, and
the insulating tape covers at least part of the overlapping portion.

4. The secondary battery according to claim 1, wherein an amount of the polyimide in the substrate layer is 80% by mass or more.

5. The secondary battery according to claim 1, wherein the substrate layer further contains a resin other than the polyimide, and is made of a polymer alloy of the polyimide and the resin other than the polyimide.

6. The secondary battery according to claim 1, wherein the substrate layer has a multilayer structure containing a polyimide layer and a resin layer other than the polyimide.

7. The secondary battery according to claim 1, wherein the adhesive layer further contains a resin other than the silicone, and is made of a polymer alloy of the silicone and the resin other than the silicone.

8. The secondary battery according to claim 1, wherein the adhesive layer has a multilayer structure containing a silicone layer and a resin layer other than a silicone.

9. The secondary battery according to claim 1, wherein the silicone contained in the adhesive layer is dimethylpolysiloxane or diphenylpolysiloxane.

10. The secondary battery according to claim 1, wherein the polyimide contains at least one of a wholly aromatic polyimide, a semi-aromatic polyimide, or a thermosetting polyimide.

11. The secondary battery according to claim 1, wherein the polyimide contains at least one of polypyromellitimide, polyetherimide, or thermosetting polyimide formed by a reaction between bismaleimide and aromatic diamines.

12. The secondary battery according to claim 1, wherein the insulating tape further has an insulating filler-containing layer between the substrate layer and the adhesive layer.

\* \* \* \* \*